March 18, 1969 R. J. BROWN ET AL 3,434,092
AIRFLOW-ELECTRIC COUPLING
Filed June 26, 1967
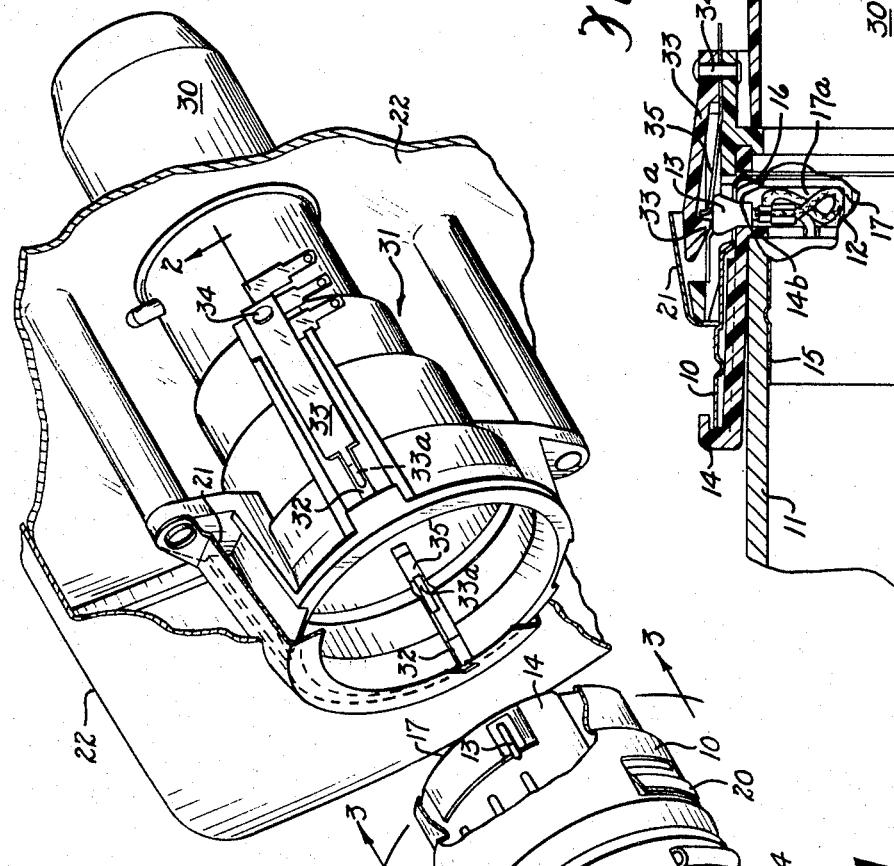
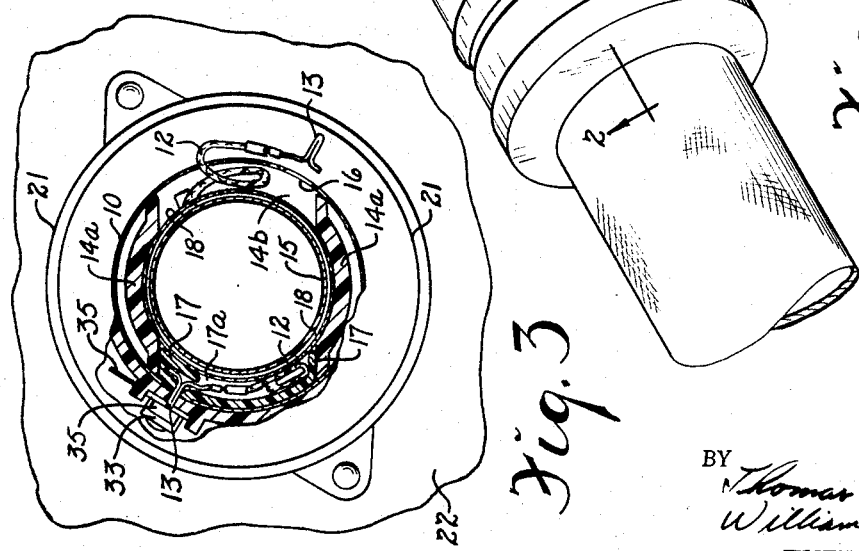
INVENTORS
ROBERT J. BROWN
JOHN J. KOWALEWSKI
JOHN J. MOUGHTY
BY
*Thomas C. Betts*
*William J. Henry*
THEIR ATTORNEYS

United States Patent Office

3,434,092
Patented Mar. 18, 1969

3,434,092
AIRFLOW-ELECTRIC COUPLING
Robert J. Brown, South Salem, N.Y., and John J. Kowalewski, Riverside, and John J. Moughty, Old Greenwich, Conn., assignors, by mesne assignments, to Consolidated Foods Corporation, Chicago, Ill., a corporation of Maryland
Filed June 26, 1967, Ser. No. 648,653
U.S. Cl. 339—16                                4 Claims
Int. Cl. H01r 3/04

ABSTRACT OF THE DISCLOSURE

A coupling for a vacuum cleaner suction hose having integral conductors which are connected with a pair of radially extending contact blades projecting from a push connector part of the coupling which is attached to one end of the hose. The receptacle part of the coupling which receives the push connector has a pair of slots for receiving the contact blades. A second pair of "live" contacts are accessible from the inner end of the slots for engagement with the contact blades, and to prevent accidental access to the second pair of contacts, which are "live" when the cleaner is in operation and the hose is not attached to the suction inlet, a pair of resilient fingers are positioned in the receptacle part of the coupling in order to cover the "live" contacts.

Background of the invention

The invention relates to a coupling for connecting an airflow-electric hose with a vacuum cleaner of the general type disclosed in copending applications Ser. Nos. 423,269 U.S. Patent 3,339,168 and 467,634 assigned to the assignee hereof, except that the coupling according to the present invention does not provide relative rotation between the coupled parts, i.e. the hose cannot swivel relative to the suction inlet of the cleaner.

The coupling according to the invention is particularly adapted for use with the hose disclosed in copending application Ser. No. 592,827 wherein a swivel connection is provided between the other end of the hose which is attached to the bent end tube or hose handle and therefore the hose can be connected to the vacuum cleaner without a swivel coupling at that end of the hose.

Summary of the invention

The coupling according to the invention comprises a minimum of simple parts for economy in manufacture, assembly and repair, without sacrificing reliability in use.

A primary object of the invention therefore is to provide a simple airflow electric coupling for a vacuum cleaner.

Another object of the invention is to provide an economical airflow electric coupling of improved construction and design for vacuum cleaners.

The foregoing objects of the invention will become apparent from the following detailed description of a presently preferred embodiment thereof, illustrated in accompanying drawing.

Brief description of the drawing

FIG. 1 is an exploded perspective view of the coupling according to the invention.

FIG. 2 is a cross-sectional view taken generally on line 2, 2 of FIG. 1 with the parts shown in FIG. 1 in assembled relation.

FIG. 3 is a cross-sectional view taken on line 3, 3 of FIG. 1 showing details of construction of the hose coupling.

Description of preferred embodiment

Referring to the drawing the coupling according to the invention comprises a metallic push connector shell 10 for attaching the hose to a vacuum cleaner in the usual manner. The hose contains conductor wires 12 embedded therein as is known, which are connected to a pair of diametrically opposed contact blades 13. The blades 13 have a crimp type fastener incorporated in the blade structure for attaching the end of the wire to the blade. An insulating sleeve 14 is disposed between the outer metal shell 10 and the hose 11 as seen in FIG. 2. The hose 11 and sleeve 14 are united by means of a ferrule 15 which is locally, outwardly expanded as shown in FIG. 2. The shell 10 is held in place on the sleeve 14 by a press fit or in any other known manner. FIGS. 2 and 3 show one of the blades 13 extending radially through an enlarged opening 16 in the shell 10 adjacent its terminal end, the arrangement of the other blade being identical. As seen in FIG. 3 the blade 13 is held in a suitably configured recess in a separate blade holder 17 of insulating material which fits into an appropriate slot in the end of sleeve 14. A pocket 17a formed in the blade holder 17 contains a loop of wire 12 and the pocket is closed by a ring 18 of insulating material. The ring 18 and ferrule 15 maintain the blade holder 17 against inward movement and the shell 10 maintains the holder 17 against radial outward movement. The blade holder 17 is held against axial movement by the flange 14b at one side, and shell 10 at the opposite side. Only one blade holder 17 is shown in FIG. 3, the other one having been omitted for the sake of clarity, and the corresponding blade 13 and the attached conductor 12 are shown in a position which they might occupy before assembly with the blade holder.

As indicated in FIGS. 2 and 3 the blade holder 17 is associated with an axially extending portion 14a of the sleeve 14 which proejcts beyond the end of the hose 11. That is, the hose terminates in the plane defined by an inwardly extending flange 14b.

The latch 20 of the push connector removably secures it, the associated sleeve 14, and hose 11 to the front cover 22 of a vacuum cleaner via the latch cap 21 which is connected to the front cover 22 in any suitable manner.

The portion of the coupling connected to the front cover 22 comprises an inlet nozzle 30 consisting of insulating material and a hollow receptacle member 31 also of insulating material. The receptacle member 31 has an appropriately configured interior surface for receiving the similarly configured push connector shell 10. As best shown in FIG. 1 the receptacle member 31 contains a pair of diametrically opposed, longitudinally extending slots 32 each of which receives a blade 13 and which extend through the wall of the receptacle except for a short distance adjacent the extreme left end of the receptacle as seen in FIG. 1. A resilient, cantilevered finger 33 of insulating material, having a radially inwardly extending projection 33a is attached to the exterior surface of the receptacle member 31 for example by means of a rivet 34 (FIG. 2). The projection 33a normally extends into the slot 32 for a distance sufficient to obstruct access to the "live" contact 35 which overlies the inner end of the slot i.e. behind the projection 33a. For example a child with a hairpin could not engage the "live" contact 35 by inserting a hairpin into the slot 32 since the hairpin would be deflected away from the "live" contact by the projection 33a. While the slot 32 extends rearwardly beyond the longitudinal extent of the projection 33a, so that the "live" contact 35 can be seen from the inside of the receptacle 31, the thickness of the receptacle at this point is sufficiently large to make it difficult to accidentally reach the contact 35 through the open end of the receptacle member 31 from a point outside the receptacle.

A gasket 40 of foam rubber, felt or comparable material is provided to form a seal with the leading edge of the shell 10 as shown in FIG. 2.

In operation, when the push connector is inserted in the receptacle member, the contact blades 13 are received in the slots 32 and travel longitudinally therein as the push connector 10 is moved to its latched position in receptacle 31. As the blade 13 engages the projections 33a of fingers 33, the blades 13 will lift the fingers 33 thereby withdrawing the projection 33a from their obstructing position in the slots. As best shown in FIG. 2 when the push connector 10 is fully inserted into the receptacle the blades 13 may be engaged with both the projections 33a of finger 33, as well as the contacts 35. However, by suitable dimensioning and shaping the projections 33a, the fiingers 33 can return to their normal position.

It will be apparent from the foregoing description of the presently preferred embodiment that various details described may be altered and therefore the appended claims are not limited to the details described above.

What is claimed is:

1. An airflow-electric coupling comprising an electric conductor carrying air hose, push connector means attached to said hose at one end, said push connector means having a pair of radially projecting blade members adjacent its terminal end; a hollow receptacle member having an opening therein for receiving said push connector means, a pair of longitudinally extending slots in said receptacle member in communication with said opening, said slots extending through the wall of said receptacle member over at least a portion of their length, a pair of leaf spring contacts connected on said receptacle member, each of said spring contacts having a free end overlying at least a portion of one of said open slots remote from the opening of said receptacle member which receives said push connector means, resilient finger means of insulating material connect edon said receptacle member for overlying each of said spring contacts said finger means having a projection extending transversely of the associated spring contact adjacent the free end of said contact and into the associated slot of said receptacle member, and latching means for removably connecting said push connector and receptacle member; said blade contacts engaging the projections of said finger means and uncovering said spring contacts for engagement therewith when said push connector is fully inserted in the opening of said receptacle.

2. An airflow-electric coupling according to claim 1 wherein said hollow receptacle member comprises a suction inlet opening of a vacuum cleaner.

3. An airflow-electric coupling according to claim 2 wherein said push connector means comprises a sleeve of insulating material surrounding the one end of said hose, means for connecting said hose and said sleeve together, said sleeve having an axially extending portion projecting beyond the one end of said hose, and a blade holder member on said axial extending portion carrying one of said blades, and means for removably connecting said blade holder member and said sleeve.

4. An airflow-electric coupling according to claim 3 wherein said last-mentioned means comprises a slot in said axial extending portion adapted to receive said blade holder member, said holder being restrained against radially outward movement relative to said axial extending portion, and a ring of insulating material within said axial extending portion engaging said holder for preventing radial inward movement thereof.

References Cited
UNITED STATES PATENTS 2,202,989 6/1940 Kitto _____ 339—16
2,987,751 6/1961 Meyerhoefer _____ 339—16

ROBERT K. SCHAEFER, *Primary Examiner.*

ROBERT A. VANDERHYE, *Assistant Examiner.*

U.S. Cl. X.R.

200—61.6